(12) United States Patent
Des Jardins et al.

(10) Patent No.: US 12,439,120 B2
(45) Date of Patent: Oct. 7, 2025

(54) PREDICTIVE POWER MANAGEMENT USING MACHINE LEARNING

(71) Applicant: Sky CP Limited, Isleworth (GB)

(72) Inventors: George Thomas Des Jardins, Isleworth (GB); Adam Rees, Isleworth (GB); Stephen Craig, Isleworth (GB)

(73) Assignee: Sky CP Limited, Middlesex (GB)

( * ) Notice: Subject to any disclaimer, the term of this patent is extended or adjusted under 35 U.S.C. 154(b) by 359 days.

(21) Appl. No.: 18/009,648

(22) PCT Filed: Jul. 16, 2021

(86) PCT No.: PCT/GB2021/051836
§ 371 (c)(1),
(2) Date: Dec. 9, 2022

(87) PCT Pub. No.: WO2022/013573
PCT Pub. Date: Jan. 20, 2022

(65) Prior Publication Data
US 2023/0224541 A1  Jul. 13, 2023

(30) Foreign Application Priority Data
Jul. 17, 2020 (GB) ..................................... 2011093

(51) Int. Cl.
*H04N 21/443* (2011.01)
*H04N 21/422* (2011.01)
*H04N 21/442* (2011.01)

(52) U.S. Cl.
CPC ... *H04N 21/4436* (2013.01); *H04N 21/42202* (2013.01); *H04N 21/44218* (2013.01)

(58) Field of Classification Search
CPC ......... H04N 21/4436; H04N 21/42202; H04N 21/44218
See application file for complete search history.

(56) References Cited

U.S. PATENT DOCUMENTS 7,411,631 B1  8/2008  Joshi et al.
9,791,910 B1  10/2017  Brown et al.
(Continued)

FOREIGN PATENT DOCUMENTS

EP    3629297 A1    4/2020
WO    2017/123334 A1  7/2017

OTHER PUBLICATIONS

International Search Report and Written Opinion dated Oct. 1, 2021, issued in connection with International App. No. PCT/GB2021/051836 (11 pages).
Combined Search and Examination Report dated Mar. 23, 2021, issued in connection with UK App. No. GB2011093.8 (6 pages).
George Nott, "AI used to predict phone unlocking, saving battery and bandwidth," CIO, article dated Feb. 27, 2019, available at https://www.cio.com/article/208184/ai-used-to-predict-phone-unlocking-saving-battery-and-bandwidth.html (3 pages).
(Continued)

*Primary Examiner* — Kyu Chae
(74) *Attorney, Agent, or Firm* — McCarter & English, LLP

(57) ABSTRACT

Systems and methods are described for power control in a media receiver device having a plurality of electronic components, using a trained model. Input signals are received from at least one electronic component. An alertness state of the device is determined using a machine learning based determiner trained to process the received input signals and predict a subsequent alertness state identifying at least one additional component or device. Power consumption by the identified components and devices is controlled based on the predicted alertness state.

10 Claims, 5 Drawing Sheets

(56) References Cited

U.S. PATENT DOCUMENTS

| | | | |
|---|---|---|---|
| 10,374,863 B2 | 8/2019 | Xu et al. | |
| 2003/0210271 A1* | 11/2003 | King | G09G 5/363 |
| | | | 715/771 |
| 2009/0002217 A1* | 1/2009 | Kryze | G08C 17/02 |
| | | | 341/176 |
| 2010/0191350 A1 | 7/2010 | Ohno | |
| 2011/0317078 A1 | 12/2011 | Johns et al. | |
| 2013/0326250 A1* | 12/2013 | Sullivan | G06F 1/3234 |
| | | | 713/323 |
| 2019/0050049 A1* | 2/2019 | Qawami | G06N 5/04 |
| 2019/0098067 A1 | 3/2019 | Sandoval | |
| 2020/0383625 A1* | 12/2020 | Han | A61B 5/7267 |

OTHER PUBLICATIONS

G. Weiss et al., "Safe Adaptation for Reliable and Energy Efficient E/E Architectures—Section 1.3.4: Automated Design Process," in Comprehensive Energy Management—Safe Adaptation, Predictive Control and Thermal Management, Springer, 2018 (6 pages).

N. Nedjah et al., "Evolutionary Synthesis of Synchronous Finite State Machines—Section 5.2: Synchronous Finite State Machines," in Evolvable Machines: Theory & Practice, Springer, 2005 (6 pages).

S. Lee et al., "Automatic Standby Power Management Using Usage Profiling and Prediction," in IEEE Transactions on Human-Machine Systems, vol. 43, No. 6, Nov. 2013 (12 pages).

\* cited by examiner

PREDICTIVE POWER MANAGEMENT USING MACHINE LEARNING

RELATED APPLICATIONS

The present application is a U.S. National Phase Application under 35 U.S.C. § 371 of International Application No. PCT/GB2021/051836 filed on Jul. 16, 2021, which claims the benefit of United Kingdom Patent Application No. GB2011093.8 filed on Jul. 17, 2020, the entire disclosures of which are expressly incorporated by reference herein.

FIELD OF THE INVENTION

This invention relates generally to reducing power consumption in a consumer device, and more particularly to a method and system for predictive power management using machine learning.

BACKGROUND

Power optimization in consumer electronic devices such as set top boxes (STBs) and televisions is generally known. However, conventional methods of power optimisation often fail to balance device responsiveness with an overriding need to meet regulatory requirements. For example, known techniques suffer from a lack of subtlety and consequently at best provide sub-optimal solutions to either the power conservation goal or the user experience goal.

New challenges in power optimisation are also brought on by the continued growth of screen sizes. While screens themselves have become more efficient than their prior CRT and plasma power hogs, they are also becoming much larger, with 75 and 85 inch TV's and larger becoming more prevalent. This is having multiple downstream effects. For example, such larger TVs are encouraging higher bandwidth and more network intensive uses, such as 4K and 8K streams. At the same time, the large screen size has enabled non-TV uses, such as screen savers that present family photo albums.

What is desired are improved system configurations and methods to better conserve power, as well as network resources, while still providing responsive device functionality and well-maintained device-user interaction experience.

SUMMARY OF THE INVENTION

Aspects of the present invention are set out in the accompanying claims.

According to one aspect, there is described a method of power control in a media receiver device having a plurality of electronic components including a sensor component, comprising:
  receiving input signals from at least one electronic component;
  determining an alertness state of the device using a machine learning based determiner trained to process the received input signals and predict a subsequent alertness state identifying at least one additional component and/or device; and
  controlling power supply to the identified component and/or device based on the predicted alertness state.

The predicted alertness state of the device may be predicted based on comparison of availability of input signals from the sensor components to conditional transitions between predicted alertness states. The machine-learning based determiner may be further trained to predict a subsequent alertness state based on the received input signals and data associated with or identifying an operational context. Additional input context data may enable the trained model to predict a user's behaviour and intent to engage with the receiver, and thereby generate output to control the device components, in anticipation of the predicted interaction with the respective device components. For example, the device may be configured to control power consumption by device-components based on the predicted alertness state, by supplying and/or disconnecting power to the identified components.

The sensor components may be provided as discrete circuitry components of the device, each circuitry component providing a respective device function when supplied with power. Input signals from a sensor component may be received from a component management module of a corresponding circuitry component while power is supplied to the circuitry component. The component management module may be configured with data to control a transition between low and high powered operating states of the corresponding sensor components.

The machine-learning based determiner may comprise trained parameters defining probability values of transitioning between alertness states based on input data. The subsequent alertness state may be predicted further based on a predicted end state.

The actual operational state of the device may be monitored, wherein the trained model is updated based on monitored actual operational state. The trained model may be received from a remote server. The model may be also be configured to output data to control the device components further based on input real-time information obtained from clusters of other similar media receivers.

The circuitry components may comprise a presence detection data processing unit associated with a presence detection function, and includes one or more of: a proximity sensor, a light, a camera, a proximal device detection module, and a connected device communications interface. The subsequent alertness state may be predicted further based on data received from the connected device communications interface identifying the presence of a plurality of devices in proximity of the receiver.

Additional control signals may be output to one or more connected devices, the control signals including one or more of: a power control signal, a volume control signal, and a display brightness control signal.

At least one circuitry component may be associated with a voice activation detection function, and includes an audio input component. At least one circuitry component may be associated with a proximal device detection function, and includes a wireless data interface. At least one circuitry component may be associated with power button activation monitoring function, and includes a remote controller interface. At least one circuitry component may be associated with a data output function.

According to another aspect, there is described a computer-implemented method of using cloud/server-based resources to train/update a model for predicting device operating state transitions, where the operating states are associated with one or more sensors on the device. The machine learning is based on sensor input from the device, capturing user activity/behaviour in the device proximity. In this way, optimal power control is possible at the per sensor/component level, based on predicted user behaviour (intent to engage). Furthermore, the device may include one or more discrete circuits providing respective wake-on-trigger functionality, and the device may be configured to provide improved power management of the discrete circuits.

At least a portion of the trained model may be transmitted to a device-component, to configure the device-component to control transition between low and high powered operational states based on received data identifying interactions with the configured device-component. The device-component power settings may be persistent when the device-component is in a low power state, and may be updated at defined intervals when the device-component is in a high powered state.

According to yet another aspect, there is described a system configured to apply machine learning to power control at the individual device-component level of a device. The device is configured to receive input signals from at least one electronic component, and determine an alertness state of the device using a machine learning based classifier trained to process the received input signals and predict a subsequent alertness state identifying at least one additional component or device. The trained classifier is configured to output data to control the identified additional component or device based on the predicted alertness state.

In a further aspect, there is provided a computer program comprising machine readable instructions arranged to cause a programmable device to carry out one of the methods as described above.

BRIEF DESCRIPTION OF THE DRAWINGS

There now follows, by way of example only, a detailed description of embodiments of the present invention, with references to the figures identified below.

DESCRIPTION OF EMBODIMENTS

Figure 1:
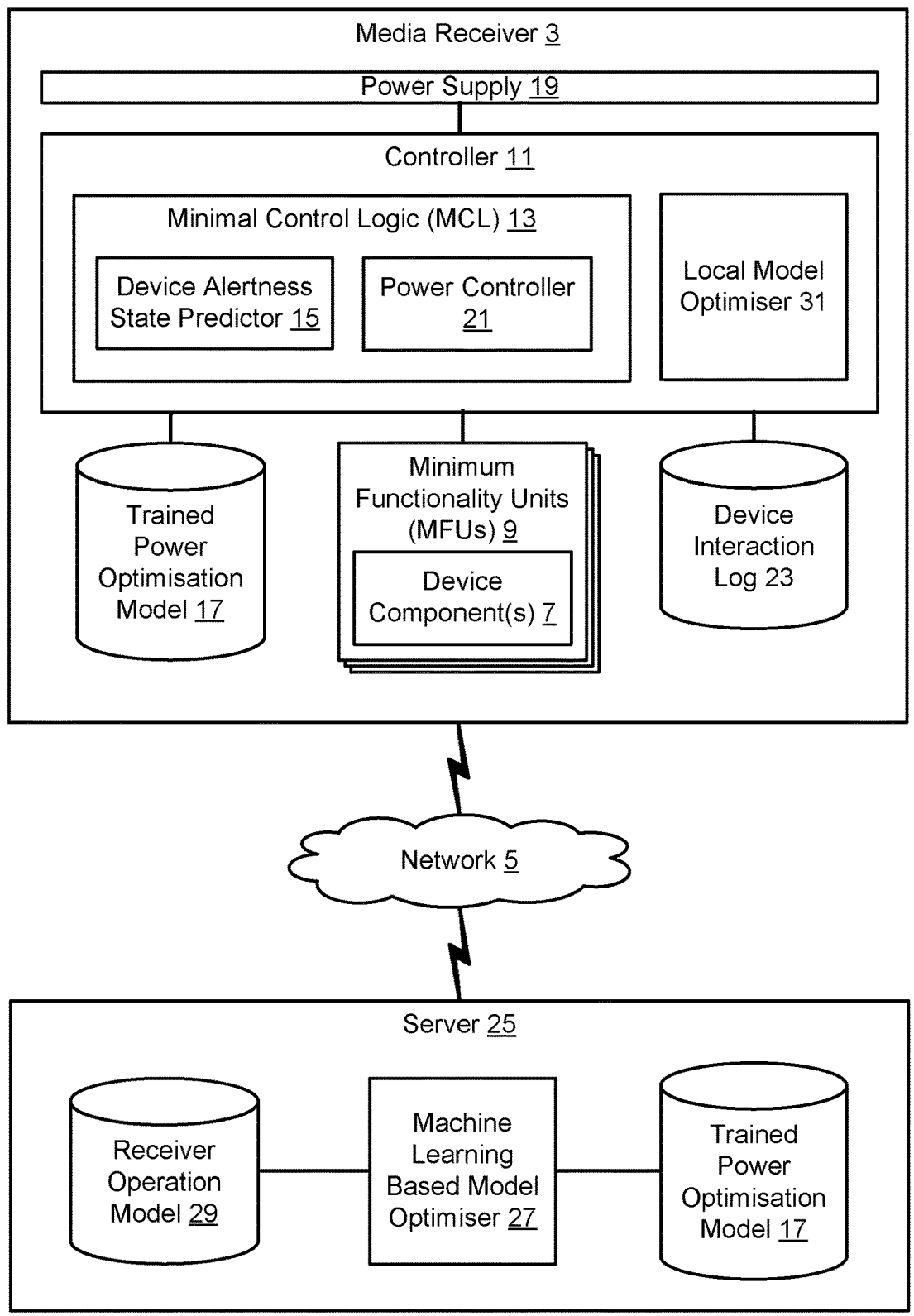
FIG. 1 is a block flow diagram showing the main components of an example system to predict and control power consumption by a media receiver, according to embodiments of the invention.

FIG. 1 is a block diagram schematically illustrating an example system 1 configured to predict and control power consumption by a media receiver 3 in accordance with exemplary embodiments of the present disclosure. The system 1 may be configured in various implementation contexts. For example, the media receiver 3 may include a set top box (STB) configured to receive broadcast video, via a broadcast channel, and/or video-on-demand (VOD), via a data network 5 such as the Internet. However, aspects of this embodiment may be applied to other forms of media receiver devices; other examples may include personal media players, tablet or desktop computers, "smart" TV devices and the like, particularly configured with hardware components to provide sensor measurement of data related to a user's proximity to, and interactions with, the receiver.

In the present exemplary embodiment, input and output device components 7 of the media receiver 3 are provided as a plurality of discrete data processing units, referred to as minimum function units (MFUs) 9. Each MFU 9 logically and/or physically defines a predefined set or group of one or more device components 7 that provide at least one device function when supplied with power for example from a power supply 11. A plurality of dedicated MFUs 9 may be provided, implementing respective logic to perform device functions such as monitoring and interpreting input signals, and automatically triggering device commands in response. For example, the MFUs 9 may be configured to respond to a received control instruction, for example to control power supply to the respective device component(s) 7, or configure one or more settings that cause an increase or decrease of power consumption by respective device components of the MFUs.

One basic device function may include a device wake-up command, for example in response to capturing an explicit power on command from a remote control unit (RCU) to the receiver 3, detecting user and/or peripheral device presence in proximity of the receiver 3, voice activation detection (VAD), etc. Other example basic device functions include establishing and receiving broadcast channels from a head end (not shown for clarity) over a broadcast link, tuning to a selected broadcast channel, downloading media content from a remote source over the data network 5, recording received media content and/or live broadcast, outputting received media content and/or live broadcast to a display, etc. It will be appreciated that one or more of the device components 7 may include an on-device interface to an external sensor component, where power supply to the interface is controlled (e.g. by a corresponding component management module 33 of the MFU 9).

Each dedicated MFU 9 may be implemented as a respective system-on-chip (SOC) to perform on-device processing. As generally known in the art, such dedicated circuits avoid wasting power by having all of the needed logic to capture the explicit action on the device in a small, isolated circuit, only signalling the entire device to transition to the on state when the local circuit's conditions have been passed, for example by detecting a wake-on-word (WUW) or the press of an "on" button on an RCU. This minimizes the amount of power consumed particularly during low power, pre-wake monitoring operations where the receiver 3 is awaiting a trigger command to transition to a "fully on" operational state. In this way, by segregating only these circuits into the smallest footprints with minimal functionality, the power use can be minimized. As will be described in detail below, the present embodiments provide yet further optimisation to overall power consumption within such device architectures.

As shown, the receiver 3 includes a controller 11 configured to perform predictive management of the MFUs 9 and corresponding device components 7. For example, the controller 7 may include memory having instructions, e.g. compiled in a minimal control logic (MCL) module 13, that, when executed on the receiver 3, cause the controller 11 to perform predictive power management operations adapted to save power consumed by the device components 7. For example, the MCL 13 may be configured to process data measured by input device components 7, such as sensor and RCU interfaces. In the present embodiments, the MCL 13 uses a machine learning based device alertness state predictor 15 trained to process received input signals and predict a subsequent device alertness state. Each predicted device alertness state identifies one or more MFUs 9 (and/or individual device components 7) that together define an associated level of device alertness. For example, the predictor 15 may use a trained power optimisation model 17 defining a hierarchical data structure of connected device alertness states, with conditional transitions therebetween based on one or more of the input signals. Each state in a sequence through the hierarchy of the trained model 17 may provide an increasing level of device alertness as a greater number of associated MFUs 9 are powered on, until the receiver 3 is fully powered on and awake. It will be appreciated that in such an example, device alertness may be quantified by the amount of information provided by the device components 7 of the MFUs 9 associated with each state, as well as the amount of intrusion into the operating environment and/or user experience caused by the associated device components when powered on.

In response to predicting a device alertness state, the MCL 13 is configured to control power supply to the MFUs 9 and the corresponding device components 7, provided by a power supply module 19. The power supply module 19 may include a power source (not shown) coupled with the receiver 3 and configured to supply power to the MFUs 9. A MFU power controller 21 of the MCL 13 may manage supply and disconnection of power to the MFUs 9 by the power supply module 19. One or more of the MFUs 9 (and/or device components 7) may include a separate power supply source, such as a battery, which may also be controlled (e.g., turned on and off) by the MFU power controller 21. The receiver 3 may also be configured to monitor and log actual interactions with the receiver 3 in a device interaction log 23. For example, the receiver 3 may store time-stamped data identifying input signals received from respective powered MFUs 9 and/or input device components 7.

In this way, the receiver 3 may be configured to segregate control for a wide variety of conditions from other control logic and sensor, and allow MCL 13 on the receiver 3 to assess and control when to transition to another state, using the trained power optimisation model 17. Furthermore, the MFU power controller 21 is configured to optimise power consumption while maintaining a high level of device responsiveness throughout the low-powered operational state of the receiver 3, by powering on only a subset of the MFUs based on machine-learned predictions of the input MFUs that are likely to be needed to enable quick responses to the respective sensor inputs (e.g. to handle user requests or respond to detected proximal activity).

The receiver 3 may obtain the trained power optimisation model data 17 from a server 25 remote from the receiver 3 (e.g. at the head end or a separate back end function, which may be provided by a cloud-based server 25) that stores trained model data 17' for substantially all devices of the system 1. The server 25 may be configured to perform a machine learning function to train the device alertness state transition model 17'. For example, the server 25 may use a machine learning based model optimiser 27 configured to optimise parameters of the conditional transitions between device alertness states of a base receiver operation model 29, based on device interaction log data 23 from receivers 3 in the system 1. The server 25 is also configured to transmit the trained power optimisation model data 17' to the receiver 3, for example over the data network 5.

The server 3 may also be configured to update the trained power optimisation model 17', for example using the machine learning based model optimiser 27 to update the parameters based on subsequently received device interaction log data 23 from one or more receivers 3 in the system 1. For example, the model optimiser 27 may update parameters of the conditional transitions of the trained model 17' based on the actual time-stamped input signals received from respective powered MFUs 9 and/or input device components 7. Additionally or alternatively, the receiver 3 may be provided with a local model optimiser module 31 to update parameters of the local stored trained power optimisation model 17, based on the local device interaction log data 23.

Advantageously, the trained models 17 may be updated based on implicit or explicit feedback cycles captured by the log data 23. This is turn enables the trained predictor 15 to implement self-learning, automatically and dynamically adapting to changes in predicted state changes associated with machine learned interactions and user behaviour, where the identified MFUs 9 of predicted device alertness states did not accurately account for actual interactions requiring different MFUs 9 to be powered on. Further advantageously, by computing the optimised parameter values of the trained model 17 in the server 25 based on locally logged state transitions and interactions (as well as explicitly and implicitly collected feedback), the updated trained model 17 may be distributed back to the receiver 3 on a regular basis. Therefore, the device alertness state predictor 15 may be used without network connectivity, enabling network communication interface(s) to be turned off to further increase low power efficiency.

The receiver 3 may be further configured with additional components (not shown for clarity) to perform functions of the receiver 3, such as establishing and receiving data over a bidirectional data connection over the network 5, and processing of data received from, and/or transmitted to, the device components 7.

Figure 2:
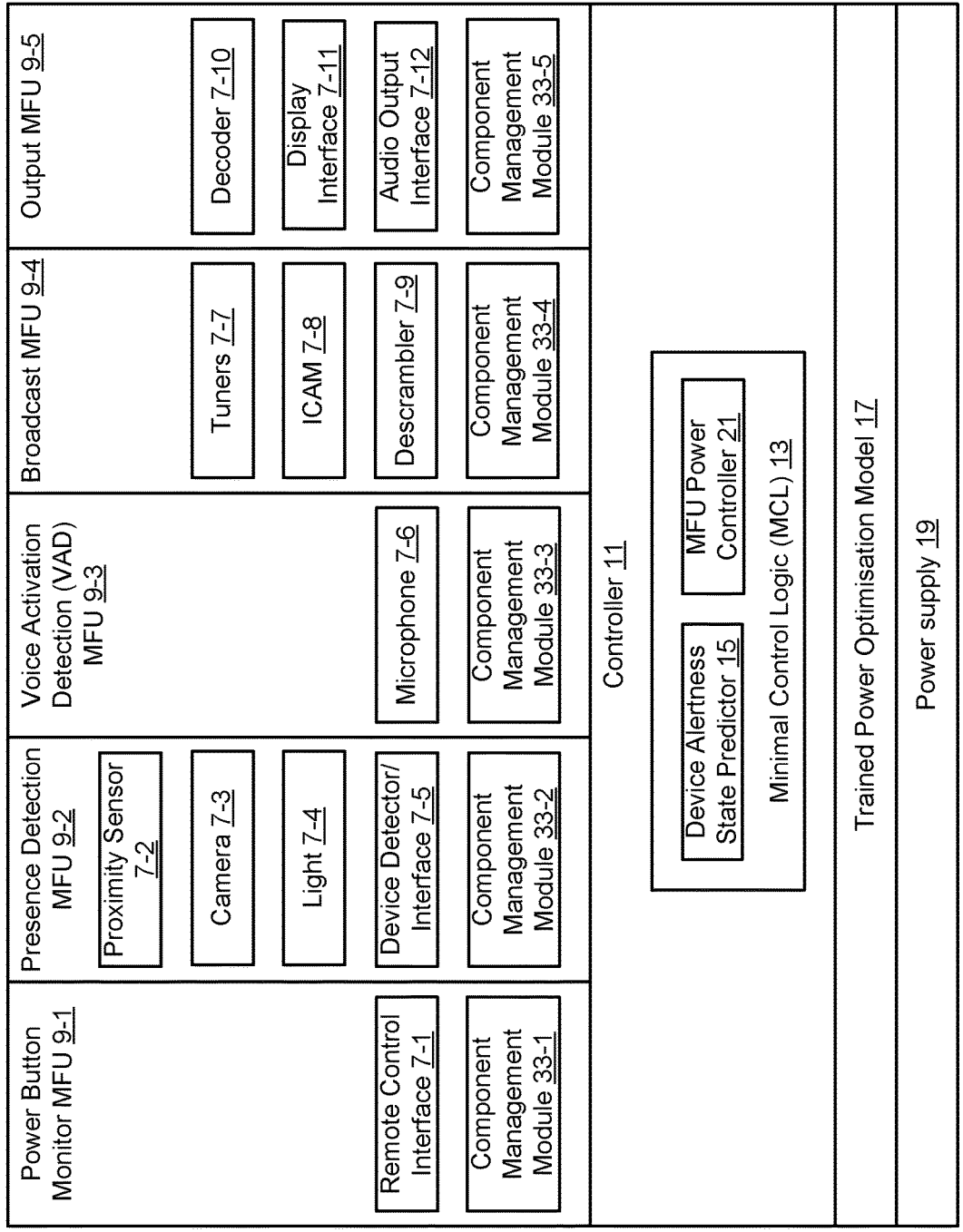
FIG. 2 is a block diagram illustrating the main elements of an exemplary implementation of the media receiver in the system of FIG. 1.

FIG. 2 is a block diagram illustrating the main elements of an exemplary implementation of the media receiver 3 in the system 1, using corresponding reference numerals to those of FIG. 1 where appropriate for corresponding elements. The receiver 3 in this specific example includes a plurality of MFUs 9 providing respective basic input and output functions via one or more respective device components 7. In the present embodiment, the controller 11 is configured to control the power supply to respective device components 7 of each MFU 9. Additionally or alternatively, the controller 11 may be configured to output signals to control other configurable settings of each MFU 9 that affect power consumption by the respective device components 7, such as volume, display brightness, and the like. The controller 11 is also communicatively coupled to the MFUs 9, for example via one or more data busses (not shown for clarity). As shown, the MFUs 9 may include input MFUs 9-1 to 9-4 providing input-based functions, for example a first input MFU 9-1 to provide a power button activation monitoring function, a second input MFU 9-2 to provide a presence detection function, a third input MFU 9-3 to provide a VAD function, and a fourth input MFU 9-4 to provide broadcast-related function(s).

Each MFU 9 may include a respective component management module 33 to manage the supply of power to the device component(s) 7 of the corresponding MFU 9. For example, the component management module 33 may include control logic to transition the associated components 7 between a low-powered operational state and a fully-powered operational state, and to toggle supply of power to the corresponding MFU 9 on and off. Each component management module 33 may also be configured to receive and pre-process input signals from the device component(s)

7 of the corresponding MFU 9, and output commands and/or received data signals to the MCL 13.

Each input MFU 9-1 to 9-4 is configured with one or more respective device components 7 to provide the associated basic input function, when supplied with power. It will be appreciated that embodiments of the receiver 3 may include some or all of the exemplary MFUs 9 shown in FIG. 2, depending on the specific implementation and context. For example, the power button monitor MFU 9-1 includes a remote control interface 7-1 to receive input signals from an RCU, such as an infrared (IR) or radio frequency (RF) based remote control, when supplied with power. An input agent 33-1 of the power button monitor MFU 9-1 may be configured to pre-process the input signals from the RCU, for example to trigger a wake command in response to receiving an explicit power on command from an RCU (e.g. from a user pressing a corresponding button on the RCU), or to classify associated user activity based on received signals from an accelerometer in the RCU (e.g. in combination with context data such as event metadata identifying a start, delay, or end of a scheduled event, user calendar event data, etc.).

The presence detection MFU 9-2 includes a proximity sensor 7-2 to detect general movement, such as a passive infrared (PIR) based sensor or motion detector. The proximity sensor 7-2 may be configured to output sensor data identifying the sensor state and/or sensor measurement (e.g. to the controller 11) on detection of motion, when supplied with power. Additionally, the presence detection MFU 9-2 may include a camera (or camera interface) 7-3, such as a 3D camera to capture depth data, and a light 7-4, such as a small red light to enable night vision capture mode of the camera 7-3, when supplied with power. The presence detection MFU 9-2 may also include one or more device detector modules 7-5 to provide respective proximal device detection function. For example, a device detector module 7-5 may include a data communication interface to broadcast for, and receive input data identifying one or more additional devices in proximity of the receiver 3, when supplied with power. The data communication interface may be configured to communicate data via one or more of WiFi®, Bluetooth®, USB, HDMI and the like. The VAD MFU 9-3 includes a microphone 7-6 to capture and provide audio signals for example to the corresponding component management module 33-3 for pre-processing, when supplied with power. For example, the component management module 33-3 of the VAD MFU 9-3 may be configured to output a wake command in response to detecting a defined wake-on-word in the captured audio.

The broadcast MFU 9-4 may include one or more tuners 7-7 that are tuneable when supplied with power, into the same or different channels of the broadcast network for simultaneous reception of the same or different television programmes and/or media items. Signals from the tuners 7-7 may be passed to a crossbar switch (not shown) which separates the data received from the tuners 7-7 into data for direct output to a display (e.g. via a display interface 7-11), data representing received television programmes for recording and subsequent playback, and user services and programme scheduling data, in accordance with the XSI standard, for example. The broadcast MFU 9-4 may also include an Integrated Conditional Access Module (ICAM) 7-8 which co-operates with a smart card (not shown) to determine whether the viewer has subscribed to a particular channel and is therefore authorised to access the channel. Parental controls may also be provided by the ICAM 7-8. The broadcast MFU 9-4 may also include a demultiplexing and descrambling circuit (referred to as a descrambler) 7-9 which receives data from the tuners 7-7 (e.g. via a crossbar switch) for direct output. The descrambler 7-9 may also receive data stored in a hard disk (not shown) of the receiver 3 for playback. The descrambler 7-9 separates the data into video data and audio data for distribution to various locations within the receiver 1. The descrambler 7-9 is also controlled by the ICAM 7-8 to enable the descrambling of the signal by authorised users.

The receiver 3 also include an output MFU 9-5 configured with device components 7 to provide basic device output functions, when supplied with power. For example, the exemplary output MFU 9-5 includes one or more audio/video decoders 7-10 for decompression and processing of encoded video data received from the descrambler 7-9, and decompression and processing of compressed audio data, operating according to the MPEG 2/4 standard, for example. Decompressed video data is supplied to a display interface 7-11 of the output MFU 9-5, which may combine the decompressed video data with on-screen display and graphics generated by on-screen display and graphics generation circuitry (not shown), and outputs the combined video data to a display via the display interface 7-11, for example an HDMI interface. Audio may also be output via the HDMI interface. A separate audio output interface 7-10 may also be provided to output audio signals to a connected output module or device.

A more detailed description of the operation of these components in this embodiment will now be given with reference to the flow diagrams of FIG. 3, for an example computer-implemented process of power control, using a trained model 17, in a media receiver 3 having a plurality of device components 7. Reference is also made to specific implementation examples schematically shown in FIGS. 4 and 5.

Figure 3:
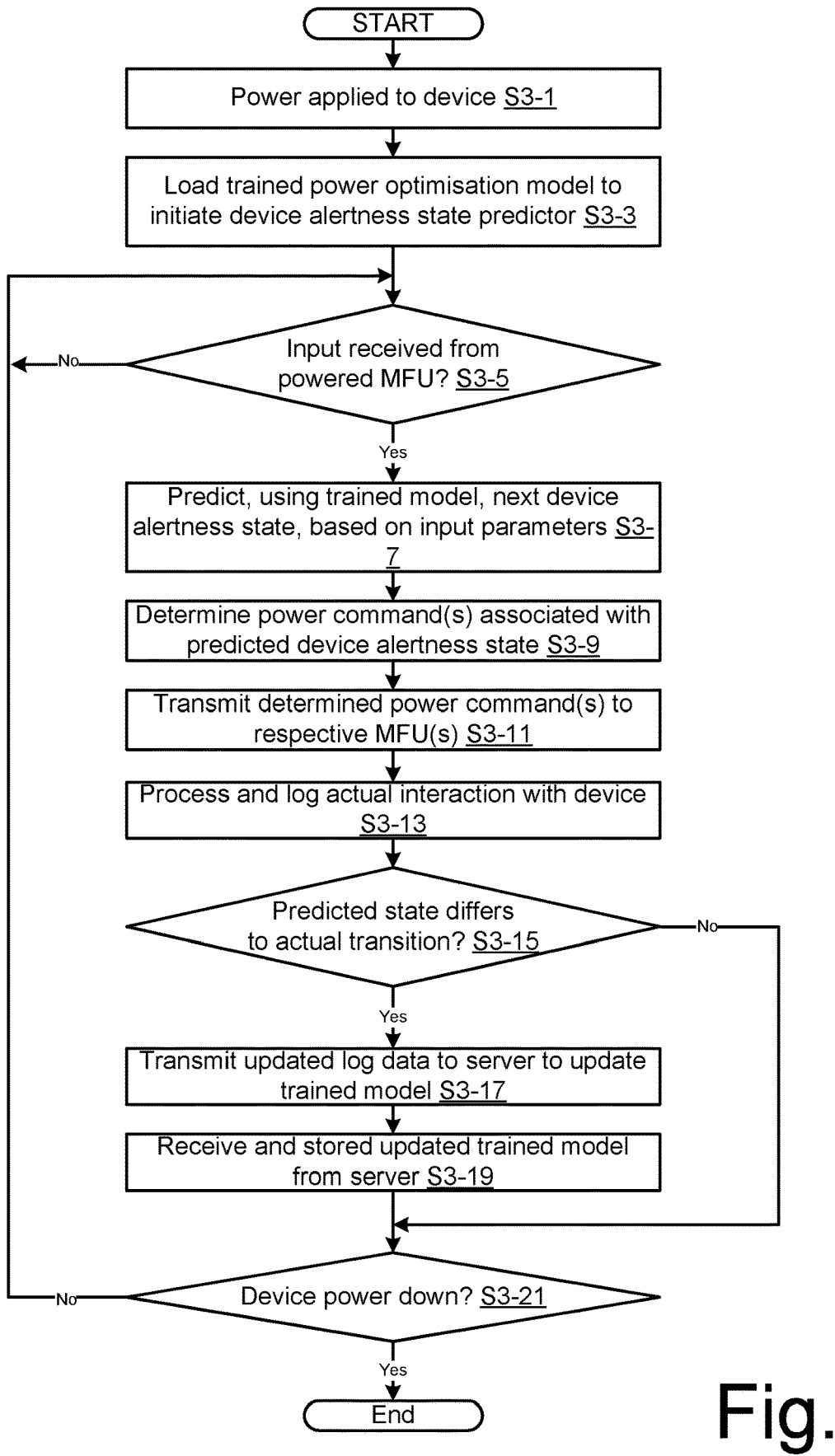
FIG. 3 is a flow diagram of an exemplary process of power control in a media receiver using a trained model, according to an embodiment.

As shown in FIG. 3, the process begins at step S3-1 where power is applied to the media receiver 3, for example to initiate a device start-up process. The media receiver 3 may be configured with an initial boot process in response to power supply module 19 detecting that a power source is connected to the receiver 3. In the present embodiment, the receiver 3 may be configured into a start-up operational mode, where a minimum level of power is supplied by the power supply module 19 to components 7 of the media receiver 3. For example, in the device start-up state, only the MCL 13 of the controller 11 may be powered on, and in response, the MFU power controller 21 may be configured to output control instructions to put, or transition, one or more of the MFUs 9 in an initial low-power operating state. The MFU power controller 21 may also be configured to disconnect the power supply to one or more of the other MFUs 9.

At step S3-3, the controller 11 loads the trained power optimisation model 17 (e.g. from a memory of the receiver 3) to initiate the device alertness state predictor 15 of the MCL 13. On device start up, the MCL 13 may be loaded with a default set of values for example before a trained set of values is received from the server 25, or may be loaded with a previously updated set of local values. The receiver 3 may be configured to request values of the trained power optimisation model 17 from the server 25, for example during a device reset and/or initialisation procedure. The trained power optimisation model 17 may include parameter values of the defined machine learning model, for example optimised by the server 25.

Figure 4:
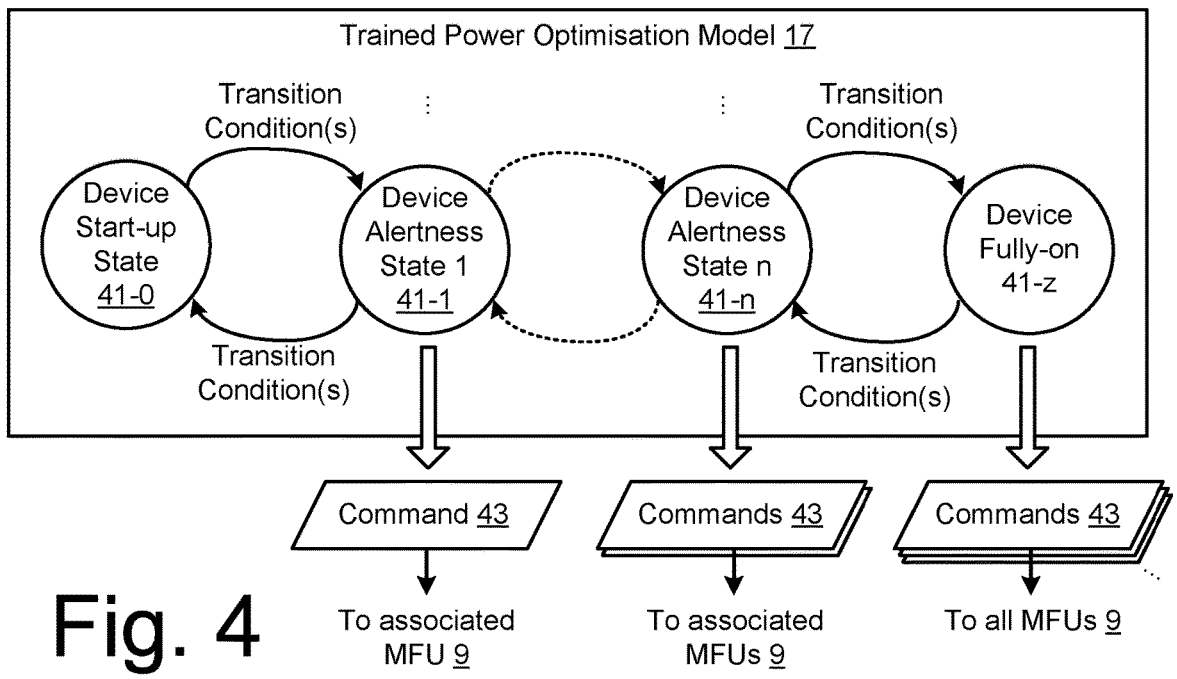
FIG. 4 schematically illustrates an example of a trained power optimisation model used in the process of FIG. 3.

FIG. 4 schematically illustrates one example of a trained power optimisation model 17. As shown, the exemplary trained model 17 includes a sequence of receiver operational states 41, from the initial minimal-powered device start-up state 41-0, through to a device fully-on state (e.g. all MFUs fully-powered) 41-z. The intermediary states of the exemplary trained model 17 define one or more sequences of device alertness states 41-1 to 41-n, with states in each sequence arranged hierarchically from one or more relatively low device alertness states, to one or more relatively high device alertness states. Each state 41 may be associated with one or more MFUs 9 that are to be powered on in response to transition to that state 41, for example by one or more commands 43 output by the MFU power controller 21 to the associated MFU(s) 9. In this way, each state in a sequence through the hierarchy of the trained model 17 may provide an increasing level of device alertness as a greater number of associated MFUs 9 are powered on. Moreover, each state of the trained model 17 may effectively fuse a variety of sensors dynamically into a set of optimum power control commands according to the predicted operating state of the receiver 3. In the device fully-on state 41-z, commands 43 may be output by the MFU power controller 21 to all of MFUs 9 of the receiver 3, for example to transition each MFU 9 to a fully powered on state.

The exemplary power optimisation model 17 also includes transition conditions between connected states 41, defining conditional transitions from one operational state 41 to another connected state 41 based on one or more input data parameters. For example, the locally stored values of the trained model 17 may comprise a likelihood probability matrix for all state transitions, defining parameters of a probability distribution function (PDF) per state transition. Each PDF of the trained model 17 may output a probability value of transitioning to a subsequent predicted state 41 based on one or more input data parameters. In such an implementation, the MCL 13 may use the stored PDF values to modify or configure the conditional state transitions of the model 17.

The levels of device alertness may be defined by the amount of information provided by the device components 7 of one or more MFUs 9 associated with each device alertness state. The levels of device alertness may be further defined by a corresponding quantified amount of intrusion into the user experience caused by the associated device components when powered on. In this way, each state 41 of the power optimisation model 17 models a state of device alertness, where associated device components such as input sensors and audio/visual output components are hierarchically organised for example by the amount of information they provide and the amount of intrusion they impinge. Moreover, the power optimisation model 17 may be trained to output a predicted 'least intrusive' state based on input parameters, for example by determining a predicted state that avoids turning on the output devices of the receiver 3 (e.g. display and audio outputs via the output MFU 9-5) during a predicted or defined scheduling period where an associated user is asleep, which would otherwise result in a loud, intrusive and undesired experience.

The statistical model described above is presented as one exemplary implementation of a data structure that is configurable to obtain a trained model 17 in the context of classifying current and/or predicted next states, As those skilled in the art will appreciate, this disclosure is not intended to be limited to any specific examples of data structure, and other forms of statistical model architectures and input feature sets are possible.

At step S3-5, the MCL 13 may be configured to wait until input is received from one or more of the powered MFUs 9 (i.e. an MFU 9 that has a power supply to the corresponding device components 7). For example, the input may be a data message including captured sensor data and/or a notification or indication such as an activation signal, interrupt, or the like. The input may be received from the device components 7 and/or the component management module 33 of a powered MFU 9. In response to determining that input is received from a powered MFU 9, the MCL 13 predicts a device alertness state using the trained power optimisation model 17, at step S3-7.

Figure 5:
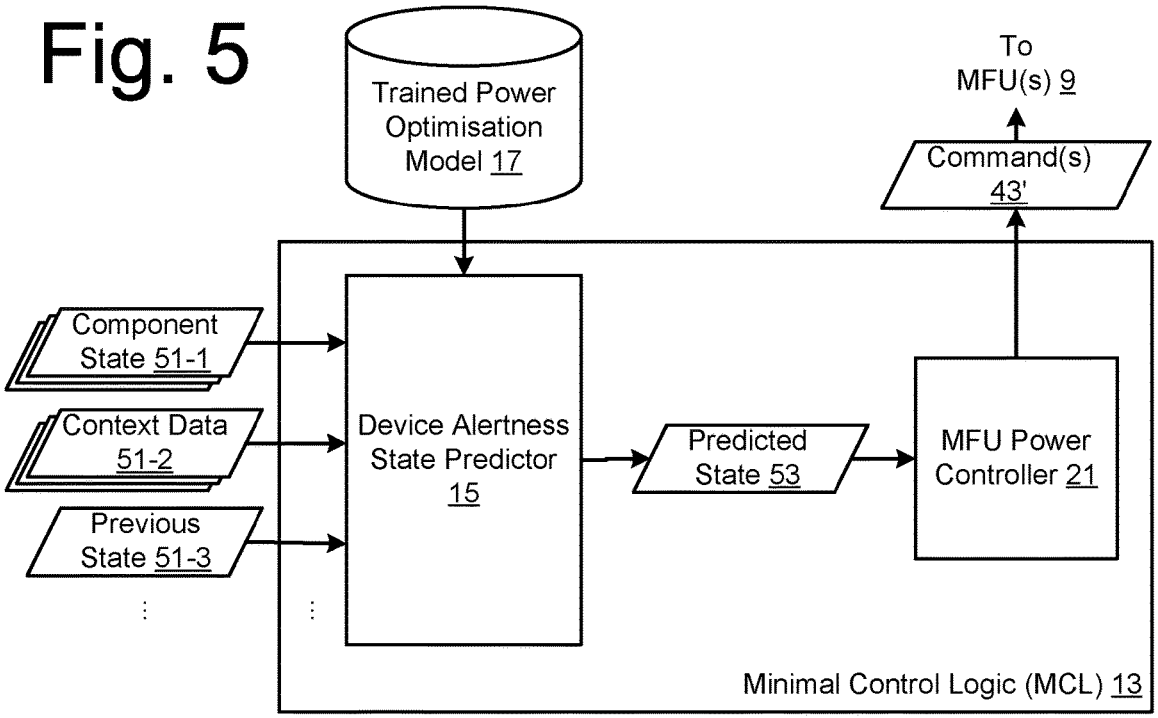
FIG. 5 is a block flow diagram showing exemplary data elements processed and generated by components of the media receiver in the process of FIG. 3.

In the present embodiment, the device alertness state predictor 15 is configured to predict the transition to a next device alertness state based on a comparison of input parameters to one or more transition conditions associated with a known or predicted current state. FIG. 5 is a block flow diagram showing exemplary data elements processed and generated by components of the MCL 13 to predict and control power supply to the MFUs 9. As shown, the device alertness state predictor 15 may receive a plurality of input data parameters 51, which are processed as input to the trained power optimisation model 17, to output a predicted device alertness state 53. It is appreciated that the device alertness state predictor 15 may output data indicating that there is no change of device state based on the present input data parameters.

The input data parameters 51 may include component state data 51-1 received from one or more of the MFUs 9 and/or the associated components 7, such as signals and/or data from an RCU via the remote control interface 7-1 (e.g. accelerometer readings, input commands), proximity sensor 7-2, camera 7-3, device detector 7-5, microphone 7-6, VAD MFU 9-3, etc. In this way, the model 17 may be trained to predict a subsequent operational state taking into account input states and/or signals from the one or more device components 7. For example, the model 17 may be trained to output a high probability for one or more possible transitions to a lower-powered operating state in the presence of input signals received from an accelerometer of an RCU (via the remote control interface 7-1) indicative of low level of movement (i.e. the user may have fallen asleep). As another example, the model 17 may be trained to output a high probability to transition to a fully-powered operating state in the presence of input signals received from the proximity sensor 7-2 as well as from the device detector 7-5 (i.e. indicative of movement of a person around the media receiver 2, rather than a pet).

As another example, input state data 51-1 from the presence detection MFU 9-2 may identify the presence of an additional electronic device in proximity of the media receiver 3, and the model 17 may be trained to output a higher probability for a defined state transition in the presence of this input data feature. As yet a further example, input state data 51-1 from a device interface 7-5 of the presence detection MFU 9-2 may identify the presence of one or more users in proximity of the media receiver 3. The model 17 may be trained to output different probabilities for a defined state transition in the presence of such an input data feature, depending on the current time of day. For example, data signals from a wearable device may identify the presence of two separate heartbeats, and the trained model 17 may output a high probability to transition to an operational state that outputs a low volume command setting to the audio output interface 7-12 and/or a connected sound device. It is appreciated that the model 17 may be trained via a supervised learning algorithm, for example by prompting the user for acknowledgement of a predicted state transition and/or associated output command(s), and reinforcing the resulting parameters of the trained model accordingly.

The input data parameters 51 may also include context data 51-2 associated with or identifying an operational context. The context data may be received from the controller 11 and/or a remote server, including information such as time, date, scheduling, calendar events, event metadata, etc. In this way, the model 17 may be trained to predict a subsequent operational state taking into account the metadata of the context of the device, such as when the end time of a football match has been extended due to extra time, or scheduling of a long running event such as the Olympics.

As another example, the context data may include real-time information obtained from a plurality of remote devices, such as a predicted and/or actual operational state from other media receivers 3 in the system 1. Crowd behaviour, determined from such context data, can be used to identify real-time trends, such as breaking news events, that cause deviations in normal viewing behaviour across the viewing population. The controller 11 may be configured to determine a signal indicative of a detected event, and provide the determined signal as one of the inputs 51 to the trained model 17 to influence a prediction. For example, the detected event may be identified from signal data indicating a cluster of devices all being turned off around the same time. The receiver 3 may also store data identifying the last predicted state, provided as one of the inputs 51 to the trained model 17 to predict a current or next state.

At step S3-9, the MFU power controller 21 determines the one or more commands 43 associated with the predicted device alertness state 53. In one exemplary implementation, the mapping of states to output commands is defined in the trained model 17. At step S3-11, the MFU power controller 21 transmits the determined commands 43 to the respective MFUs 9 (e.g. to the component management module 33 or the corresponding device components 7 themselves). In the present embodiment, the transmitted commands 43 to control, or cause the MFUs to control, functions and/or settings that increase or decrease power consumption by the respective device components 7. For example, the predicted device alertness state 53 may be associated with one or more MFUs 9, each MFU 9 having one or more corresponding sensor hardware components 7. In response to receiving a predicted device alertness state 53, the MFU power controller 21 may be configured to supply (e.g. switch on) power to the one or more sensor hardware components 7, for example via respective component management modules 33. The MFU power controller 21 may also be configured to disconnect (e.g. switch off) the power supply to hardware components 7 of the other MFUs 9.

Referring again to the example shown in FIG. 5, the device alertness state predictor 15 receives input data parameters 51, and uses the loaded PDF parameter values of the trained model 17 to determine a predicted probability of transitioning to a subsequent state 41 based on one or more input data parameters. The predicted probability values may be combined with other determining conditions based on one or more additional input data parameters, to determine if the conditions are satisfied for the candidate transition. The predictor 15 may determine a probability value for each possible conditional transition from a current device state 41 (e.g. as stored and monitored by the receiver 3).

Table 1 shows determined outputs of a simplified example of a transition condition between two states of a trained power optimisation model 17, based on example input parameters received by the predictor 15. As can be seen, this example transition of the power optimisation model 17 is trained to predict a conditional transition based on sensor inputs (e.g. a proximity sensor 7-2 activation signal and an RCU power button state), depending on the current time 51-1. The receiver 3 is thereby configured to respond to detected presence by automatically supplying power to the output MFU 9-5 (e.g. to turn on a connected TV), but to avoid turning on the output MFU 9-5 in the middle of the night. On the other hand, the resulting output would be different if the inputs represent the presence of a user in proximity of the receiver 3 at 2 am.

TABLE 1

| Inputs to Predictor 15 | Output of example conditional transition to predicted next state: (PowerON) or (PIR*PDF{CurrentTime}) | Output from MFU Power Controller 21 |
|---|---|---|
| CurrentTime: 6:30am PowerON [RCU Power On button detected]: False PIR [PIR sensor activation (Sensitivity, Threshold)]: True | (False) or (True * PDF{6:30am} = 0.6) → True | Turn_on, to Output MFU 9-5 |
| CurrentTime: 2am PowerON [RCU Power On button detected]: False PIR [PIR sensor activation (Sensitivity, Threshold)]: True | (False) or (True * PDF{2am} = 0) → False | No state transition |

As another example, the input parameters may further capture a scenario where the user does not speak to the receiver 3 (e.g. lack of activation signal from the VAD MFU 9-3). In such a case, the predicted state 53 may result in disconnecting power supply (or keeping unpowered) the output MFU 9-5, or at least the display interface 7-11 and the audio output interface 7-12. On the other hand, the MFU power controller 21 may be configured to output a power on command to the small red light 7-4 of the presence detection MFU 9-2, to preserve a night vision mode of the camera 7-3.

At step S3-13, the controller 11 may be configured to process and log the subsequent actual interaction with the device. For example, after transitioning to the predicted device alertness state 53, the receiver 3 may receive actual inputs, such as a sensor signal and/or input interaction with the device, which when processed, cause the receiver 3 to transition to a different device alertness state 41 than the predicted state 53. MCL 13 may store a new time-stamped entry in the device interaction log 23 identifying the subsequent actual input interaction. The time-stamped log entry may also include data identifying the current predicted device alertness state 53 and the actual resulting device alertness state 41. At step S3-15, if the MCL 13 determines that the predicted state 53 differs to the resulting actual state 41, then at step S3-17, the MCL 13 may transmit the updated log data 23 to the server 25, to cause the machine learning based model optimiser 27 to update the trained power optimisation model 17 based on the updated log data 23. At step S3-19, the MCL 13 may receive and store the updated parameter values of the trained model 17 from the server 25, for subsequent re-loading and use by the device state alertness predictor 15. The server 25 may be configured to store and maintain a local model per registered media receiver 3 in the system 1. The MCL 13 then continues to respond to subsequent inputs received from powered MFUs, for example until the receiver 3 is powered down at step S3-21.

In this way, the system 1 advantageously implements dynamic self-learning to dynamically update and re-configure the power control model. The receiver 3 is thereby configured to adapt to actual device interactions that differ to the base default receiver operation model 29. As one example, a device user who is a night shift worker is likely to have a different day/night cycle such that the resulting behaviour and interactions with the receiver 3 is opposite to the modelled behaviour captured by the trained model 17. By taking explicit or implicit actions that contradict the computed/inferred predicted behaviour and device state transitions, the system 1 can recalculate new model parameters (e.g. new PDF parameters) to distribute to the receiver 3 for the next cycle.

Thus, when the exemplary user walks towards the receiver 3 at 2 am and uses the RCU to turn the power on, this actual interaction would be logged and communicated to the server. Based on the received log file data 23, the server 25 would update and distribute new parameter values of the trained power optimisation model 17. Referring back to the example shown in Table 1, this explicit feedback cycle may result in the PDF value for 2 am to be updated to 0.5, thereby causing the MFU power controller 21 of that user's receiver 3 to output a power on command 43 to the output MFU 9-5 in response to detection of presence around the device at 2 am. As those skilled in the art will appreciate, a similar update would result for an implicit feedback cycle, for example log data 23 capturing the lack of interaction with the receiver 3 (e.g. at 6:30 am), causing the output MFU 9-5 to remain disconnected from the power supply despite an apparent activation signal from the proximity sensor 33-2.

The model optimiser 27 may also be configured to train the model 17 to output predicted subsequent device alertness states 53 that are associated with a predicted end goal operational state, for example taking into account the user's end goal. For example, the received log data 23 may include captured data extending monitoring and feedback collection all the way to the success of that end goal, which would then be processed by the model optimiser 27 in updating the trained model 17.

In this way, the system 1 may be further configured to use machine learning to capture the various, subtle transitions a user would likely desire, as well as an understanding of failure modes from the user's point of view, and embed into the trained model 17 the corresponding ability for the MCL 13 to transition between device states accordingly. Advantageously, this provides yet further resource optimisation, by minimising the amount of power and network resources used while maximizing the responsiveness of the receiver 3 to the users' predicted end goals.

Computer Systems

Figure 6:
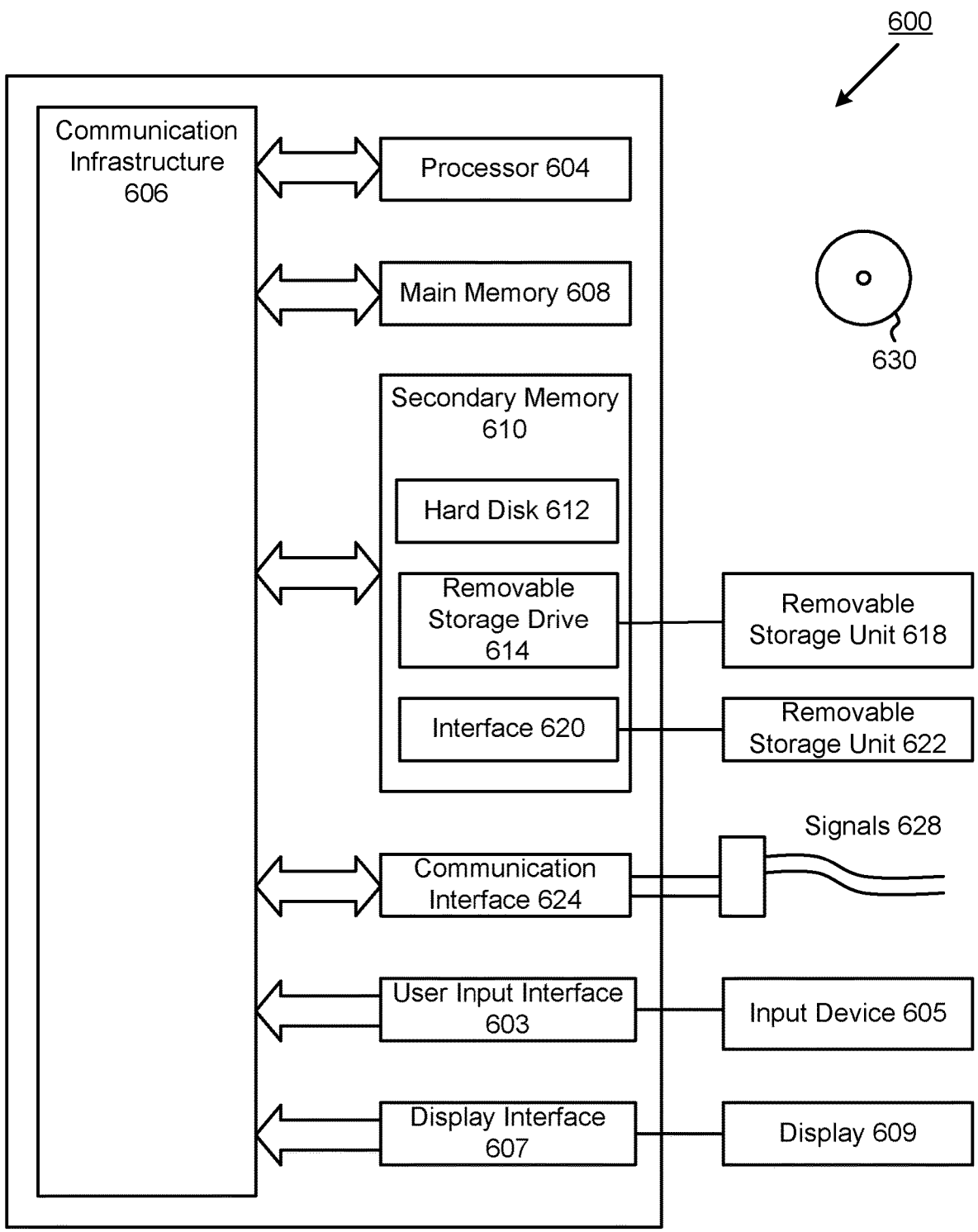
FIG. 6 is a diagram of an example of a computer system on which one or more of the functions of the embodiments may be implemented.

The entities described herein, such as the receiver 3 and the server 25, may be implemented by computer systems such as computer system 1000 as shown in FIG. 6. Embodiments of the present invention may be implemented as programmable code for execution by such computer systems 600. After reading this description, it will become apparent to a person skilled in the art how to implement the invention using other computer systems and/or computer architectures.

Computer system 600 includes one or more processors, such as processor 604. Processor 604 may be any type of processor, including but not limited to a special purpose or a general-purpose digital signal processor. Processor 604 is connected to a communication infrastructure 606 (for example, a bus or network). Various software implementations are described in terms of this exemplary computer system. After reading this description, it will become apparent to a person skilled in the art how to implement the invention using other computer systems and/or computer architectures.

Computer system 600 also includes a user input interface 603 connected to one or more input device(s) 605 and a display interface 607 connected to one or more display(s) 609, such as display device 21. Input devices 605 may include the RCU interface 7-1 and may further include, for example, a pointing device such as a mouse or touchpad, a keyboard, a touchscreen such as a resistive or capacitive touchscreen, etc. After reading this description, it will become apparent to a person skilled in the art how to implement the invention using other computer systems and/or computer architectures, for example using electronic devices with integrated input and display components.

Computer system 600 also includes a main memory 608, preferably random access memory (RAM), and may also include a secondary memory 610. Secondary memory 610 may include, for example, a hard disk drive 612 and/or a removable storage drive 614, representing a floppy disk drive, a magnetic tape drive, an optical disk drive, etc. Removable storage drive 614 reads from and/or writes to a removable storage unit 618 in a well-known manner. Removable storage unit 618 represents a floppy disk, magnetic tape, optical disk, etc., which is read by and written to by removable storage drive 614. As will be appreciated, removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that previously found in video game devices), a removable memory chip (such as an EPROM, or PROM, or flash memory) and associated socket, and other removable storage units 622 and interfaces 620 which allow software and data to be transferred from removable storage unit 622 to computer system 600. Alternatively, the program may be executed and/or the data accessed from the removable storage unit 622, using the processor 604 of the computer system 600.

Computer system 600 may also include a communication interface 624. Communication interface 624 allows software and data to be transferred between computer system 600 and external devices. Examples of communication interface 624 may include a modem, a network interface (such as an Ethernet card), a communication port, a Personal Computer Memory Card International Association (PCMCIA) slot and card, etc. Software and data transferred via communication interface 624 are in the form of signals 628, which may be electronic, electromagnetic, optical, or other signals capable of being received by communication interface 624. These signals 628 are provided to communication interface 624 via a communication path 626. Communication path 626 carries signals 628 and may be implemented using wire or cable, fibre optics, a phone line, a wireless link, a cellular phone link, a radio frequency link, or any other suitable communication channel. For instance, communication path 626 may be implemented using a combination of channels.

The terms "computer program medium" and "computer usable medium" are used generally to refer to media such as removable storage drive 614, a hard disk installed in hard disk drive 612, and signals 628. These non-transitory computer program products are means for providing software to computer system 600. However, these terms may also include signals (such as electrical, optical or electromagnetic signals) that embody the computer program disclosed herein.

Computer programs (also called computer control logic) are stored in main memory 608 and/or secondary memory 610. Computer programs may also be received via communication interface 624. Such computer programs, when executed, enable computer system 600 to implement embodiments of the present invention as discussed herein. Accordingly, such computer programs represent controllers of computer system 600. Where the embodiment is implemented using software, the software may be stored in a computer program product 630 and loaded into computer system 600 using removable storage drive 614, hard disk drive 612, or communication interface 624, to provide some examples.

Alternative embodiments may be implemented as control logic in hardware, firmware, or software or any combination thereof. For example, the trained model 17 and associated predictor 15 may be implemented in hardware and/or software as a standalone entity for installation as a component in a receiver 3, and may further include the MCL 13 and local model optimiser 31 modules.

It will be understood that embodiments of the present invention are described herein by way of example only, and that various changes and modifications may be made without departing from the scope of the invention.

For example, in the embodiments described above, the controller is configured to perform predictive management of MFUs provided in the media receiver. As those skilled in the art will appreciate, in an alternative embodiment, the controller may be further configured to output signals to control configurable settings of one or more MFUs provided on external and/or remote devices in data communication with the media receiver, based on a predicted subsequent device alertness state. For example, the controller may output signals to control, or configure an MFU to control, a volume setting of an external speaker or soundbar device, a screen brightness setting of a connected display device, and the like. In the embodiments described above, the MCL predicts a device alertness state using a trained power optimisation model stored on the media receiver, then transmits the determined power commands to control, or cause the MFUs to control, functions and/or settings that increase or decrease power consumption by respective device components of the MFUs. As those skilled in the art could be appreciate, at least a portion of the trained model could be stored on an MFU. For example, one or more of the MFUs may be configured with local operational states and conditional transitions to implement respective basic functions according to received input data and/or signals. The local conditional state transitions of an MFU may include an initial low-powered state, a fully-powered state, and at least one conditional transition therebetween based on input criteria. The local conditional state transitions defined on a particular MFU may be configured to trigger a state transition based on received sensor values and/or context data, resulting in output of a command to a local component of the respective MFU. Each MFU may also store data identifying the last predicted state, provided as an input to the corresponding portion of the trained model to predict a current or next state for the MFU (and the corresponding device components).

In this way, each component management module of the MFUs may be configured to transition between local operational states of the trained model based on input parameters, for example a stored previous operational state, sensor input from associated components, and data associated with or identifying an operational context such as time, date, event metadata, etc. It is appreciated that the local portion of a trained (or updated) model may be pushed to a corresponding MFU for storage and use, even in a low-powered state. The configured power settings may remain persistent when the MFU and/or device is in a low power state. Additionally or alternatively, the configured power setting may be updated at defined intervals (and e.g. more frequently refreshable) when the MFU is in a high powered state.

Reference in this specification to "one embodiment" are not necessarily all referring to the same embodiment, nor are separate or alternative embodiments mutually exclusive of other embodiments. In particular, it will be appreciated that aspects of the above discussed embodiments can be combined to form further embodiments. Similarly, various features are described which may be exhibited by some embodiments and not by others. Yet further alternative embodiments may be envisaged, which nevertheless fall within the scope of the following claims.

The invention claimed is:

1. A media receiver device comprising:
a plurality of discrete circuitry units, each providing a respective device function when supplied with power, the circuitry units including:
a presence detection unit having a plurality of sensor components, and a corresponding control module operable to control power supply to the plurality of sensor components in response to a received command;
a power button monitor unit having a remote control interface component, and a corresponding control module operable to control power supply to the remote control interface component in response to a received command; and
an output unit having a plurality of output device interface components, and a corresponding control module operable to control power supply to the plurality of output device interface components in response to a received command; and
one or more processors configured to:
predict, using a machine learning based trained model, a subsequent operating state of the media receiver device based on a current operating state and one or more device parameters, wherein the trained model includes data defining a hierarchy of operating states of the device and transition conditions therebetween based on one or more device parameters, each operating state in the hierarchy being associated with an increasing number of said discrete circuitry units that are to be supplied with power, the hierarchy of operating states including:
a first operating state associated with the presence detection unit;
a second operating state further associated with the power button monitor unit, having a conditional transition from the first operating state based on at least one or more device parameters received from the presence detection unit; and
a third operating state further associated with the output unit, having a conditional transition from the second operating state based on at least one or more device parameters received from the power button monitor unit; and
transmit a command to the discrete circuitry units associated with the predicted subsequent operating state of the device to cause power to be supplied to the corresponding components thereof.

2. The device of claim 1, wherein the transmitted command is a command to control a transition between low and high powered operating states of the corresponding plurality of components.

3. The device of claim 1, wherein the data defining transition conditions of the trained model comprises probability values of transitioning between operating states based on input device parameter values.

4. The device of claim 3, wherein the one or more processors is configured to predict the subsequent operating state further based on a predicted end operating state.

5. The device of claim 1, wherein the one or more processors is further configured to monitor an actual operational state of the device, wherein the trained model is updated based on the monitored actual operational state.

6. The device of claim 1, wherein the trained model is received from a remote server.

7. The device of claim 1, wherein the presence detection unit includes one or more of: a proximity sensor, a light, a camera, a proximal device detection module, and a connected device communications interface.

8. The device of claim 7, wherein the one or more device parameters includes data received from the connected device communications interface identifying the presence of a plurality of devices in proximity of the media receiver device.

9. The device of claim 1, wherein the one or more processors is further configured to output control signals to one or more connected devices, the control signals including one or more of: a power control signal, a volume control signal, and a display brightness control signal.

10. A non-transitory storage medium comprising machine readable instructions stored thereon for operating the media receiver device of claim 1.

* * * * *